May 6, 1930.  E. S. McGONEGAL  1,756,949
PORTABLE GRINDING TOOL
Filed Nov. 10, 1927   2 Sheets-Sheet 1
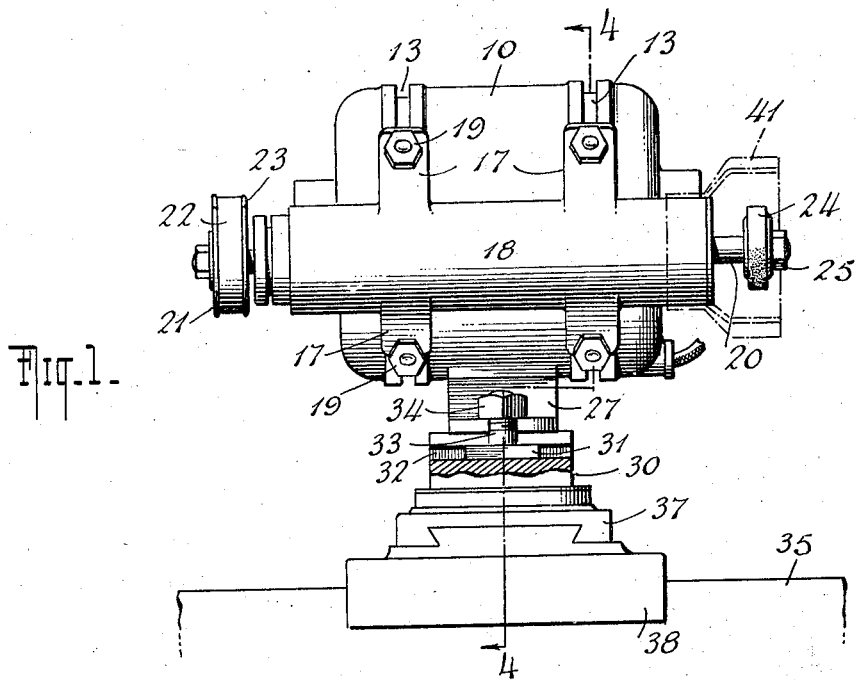
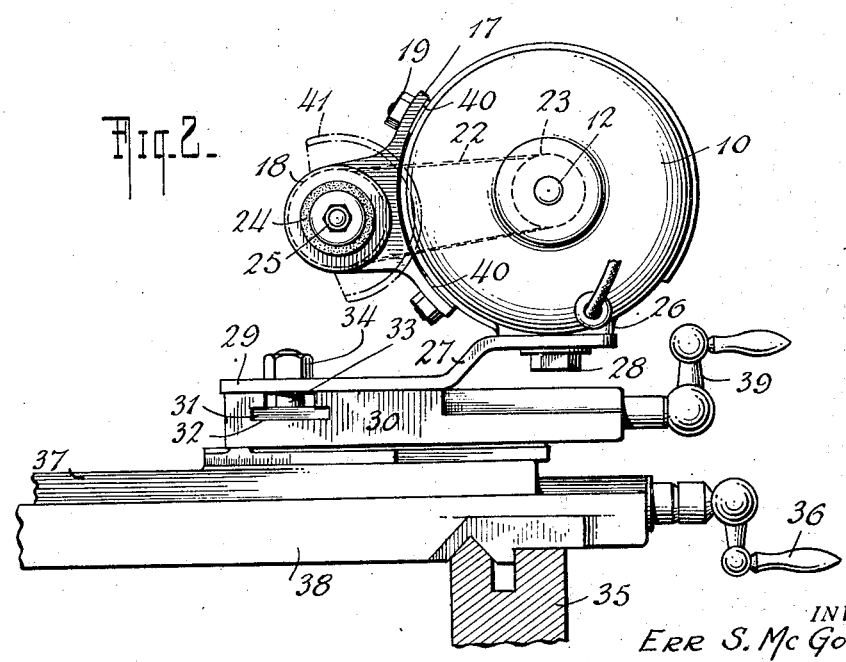
INVENTOR
ERR S. McGONEGAL
BY
ATTORNEYS May 6, 1930.  E. S. McGONEGAL  1,756,949
PORTABLE GRINDING TOOL
Filed Nov. 10, 1927   2 Sheets-Sheet 2
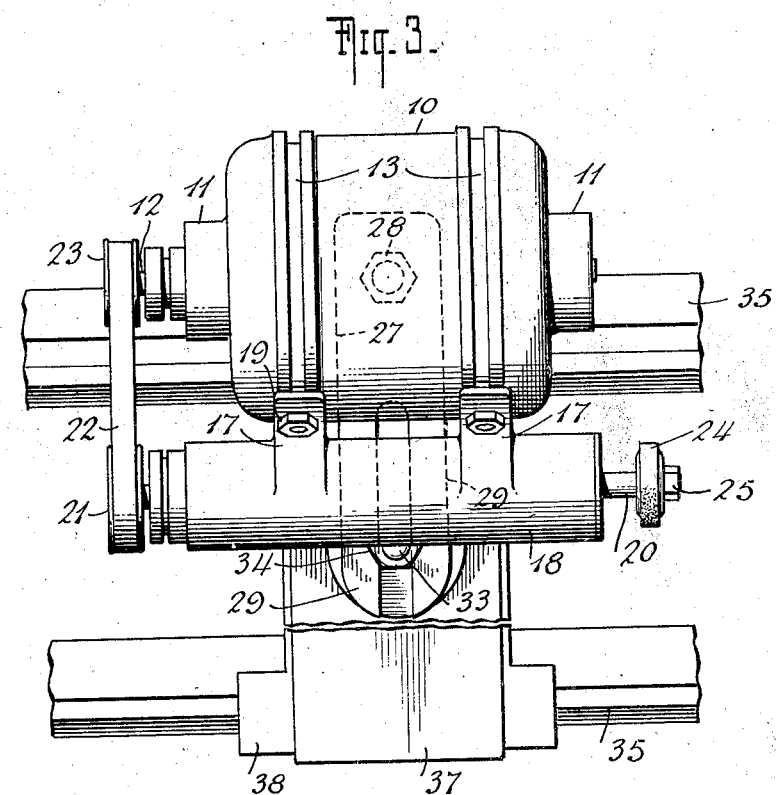
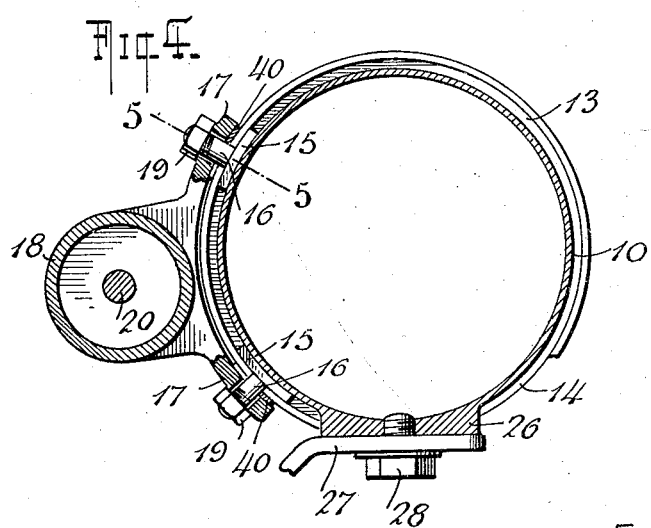
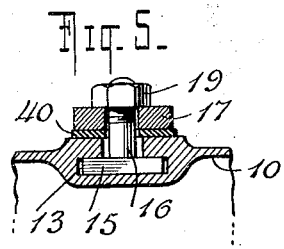
INVENTOR
ERR S. McGONEGAL
BY
ATTORNEYS Patented May 6, 1930

1,756,949

UNITED STATES PATENT OFFICE

ERR S. McGONEGAL, OF RUTHERFORD, NEW JERSEY

PORTABLE GRINDING TOOL

Application filed November 10, 1927. Serial No. 232,213.

The invention relates to portable grinding tools of the type used in machine shops and the like in combination with lathes or other machines for grinding tools, dies, jigs, fixtures or mechanical parts and similar elements, to finish the same or to correct inaccuracies therein where precision is of utmost importance.

The object of the invention is to provide a grinding tool of the indicated type constructed in a novel and improved manner and capable of being easily and quickly secured in the most advantageous position upon the lathe or its equivalent. A further object of the invention is to construct the grinding tool in such a manner that the grinding spindle may readily be adjusted relatively to the motor spindle and so that the operations of the grinding tool will be absolutely uniform and accurate at all times without vibration. Other more specific objects will appear from the description hereinafter and the features of novelty will be pointed out in the claims.

In the accompanying drawings which illustrate an example of the invention without defining its limits, Fig. 1 is a side elevation of the novel portable grinding tool; Fig. 2 is an end view thereof; Fig. 3 is a plan view of the grinding tool; Fig. 4 is a section on the line 4—4 of Fig. 1, and Fig. 5 is a fragmentary detail section on the line 5—5 of Fig. 4.

As shown in the drawings, the grinding tool comprises the customary motor designed for either direct or alternating current, and having the conventional operating parts contained within a circular casing 10, provided at opposite ends with bearings 11 in which the motor spindle 12 is journaled. The casing is provided with guiding means centered at the axis of the motor spindle 12 and illustrated in the form of circumferential guides comprising outwardly open undercut annular channels 13 in the illustrated example of the invention, said channels 13 being spaced apart in axial directions and provided for instance with entering recesses 14, as shown in Fig. 4, which recesses may be replaced by other arrangements whereby the same result, set forth hereinafter, may be attained.

Clamping blocks 15 are slidably mounted in the channels 13 and are provided with threaded stems or studs 16 which project outwardly beyond said channels 13, as shown in Figs. 4 and 5; the blocks 15 with their stems or studs 16 are easily introduced into the channels 13 through the entering recesses 14 or their equivalent. The studs 16 project through openings in lugs 17 which comprise integral parts of the grinding spindle housing 18, as shown in Fig. 4, said lugs 17 being contoured to fit the external surface of the motor casing 10 in registry with the annular channels 13. The threaded studs 16 accommodate nuts 19, whereby the grinding spindle housing 18 is secured upon the motor casing 10 in external radial relation thereto and clamped in any adjusted position thereon. A grinding spindle 20 is journaled in the spindle housing 18 and projects outwardly beyond said casing at opposite ends thereof. At one end, the spindle 20 carries a pulley 21 connected by means of a belt 22 with a pulley 23 fixed upon the motor spindle 12, as shown in Fig. 3. At its other end, the spindle 20 is constructed to detachably receive a suitable grinding wheel 24 or its equivalent, which is suitably fixed in place upon said spindle 20 for instance by means of a nut 25, suitable collars being provided if necessary in the customary manner.

With the arrangement set forth, it will be obvious that the grinding spindle housing 18 with the grinding spindle 20 and grinding tool 24 is adjustable circumferentially of or about the motor casing 10 to different operative positions in radial relation thereto, said motor casing 10 during such adjustments being stationary and without change in its position, as the motor spindle 12 is in registry with the center of this adjustment, the grinding spindle 20 will remain in proper driving connection with the motor spindle 12 at all times, regardless of the radial position occupied by the grinding spindle housing 18 on the motor casing 10. Other arrangements whereby the grinding spindle 20 is adjustable in a circular direction about the motor spindle 12 as a centre, or whereby said grinding spindle 20 is adjustable to different positions circumferentially of or about said motor spindle 12, may be substituted for the channels 13 and their associated elements without departing from the spirit of this feature of the invention.

The motor casing 10 is further provided with an integral boss 26, to which a bracket 27 is detachably connected by means of a stud bolt 28. As shown in Fig. 2, the bracket 27 extends downwardly and is continued in the form of a forked member 29, whereby the grinding tool is easily and efficiently mounted in operative position, for instance, upon a lathe.

In the illustrated example, the grinding tool is fixed upon the compound rest of the lathe. To mount the grinding tool upon the lathe in the illustrated manner, it is simply necessary to remove the customary tool post from the tool post carrier 30 and to introduce a clamping block 31 into the undercut groove 32 of said carrier 30. The clamping block 31 includes an integral threaded stud 33, which projects outwardly beyond the groove 32 and through the recess of the forked member 29 for the accommodation of a nut 34, whereby the bracket 27 and consequently the grinding tool is securely fixed upon the compound rest of the lathe.

When mounted in the described manner upon the lathe, the motor casing 10 and its associated elements are firmly and rigidly supported and fixed upon the compound rest of the lathe, and the grinding spindle housing 18 with the grinding spindle 20 and grinding wheel 24 adjustable circumferentially of or about the casing 10 and relatively to the aforesaid compound rest of the lathe in whatever position the latter may be set. The grinding wheel 24 may thus be readily adjusted to the proper central position for the work in hand, without in any way requiring the motor casing 10 and the operating elements combined therewith, to be manipulated in any way. At the same time, by reason of being thus mounted upon the compound rest of the lathe, the grinding wheel 24 will have the advantage of the varied and compound adjustments which are possible through the medium of said compound rest. The latter may be of any conventional construction and mounted on the lathe bed 35 in the well known way. The customary crank handle 36 is provided for adjusting the slide 37 of the lathe on the saddle 38 thereof, and the usual crank handle 39 is provided for adjusting the tool post carrier 30 on the slide 37, it being understood that the carrier 30 is also adjustable in circular directions in the usual way. With the arrangement illustrated and described, the grinding tool is located entirely to the rear of the position usually occupied by the tool post or its equivalent in the lathe, and consequently the entire weight of the grinding tool is so distributed that any looseness in the bearing surfaces of the lathe parts is compensated and not aggravated; that is to say, the weight of the grinding tool will be exerted in directions tending to force said bearing surfaces into engagement with each other and not to separate the same, as is now generally the case.

The improved grinding tool is extremely simple in construction and capable of being quickly attached to and removed from the lathe or its equivalent, and when attached, is rigidly supported, so that undesirable vibration caused by the grinding tool is positively avoided. As a result, the grinding tool is extremely accurate in operation and may be used for all types of precision grinding. The grinding tool is furthermore capable of being easily dismantled for shipping or storage purposes, and in its dismantled condition occupies a minimum of space. The improved grinding tool may be used in all operations where grinding tools of the indicated class are generally used.

In order to vary the distance between the grinding spindle 20 and the motor spindle 12, if for any reason this should become necessary, as for instance to take care of belt stretch, shims 40 of the required thickness or in the necessary number may be introduced between the lugs 17 and the motor casing 10, as shown in the drawings. For the protection of the workman, a guard 41 of any suitable type may be arranged about the grinding wheel 24, as shown by dotted lines in Figs. 1 and 2.

Various changes in the specific form shown and described may be made within the scope of the claims without departing from the spirit of the invention.

I claim:

1. A portable grinding tool comprising a motor including a motor casing, a supporting bracket fixed to said motor casing and constituting a fixed support for supporting the motor in a predetermined operative position, a grinding spindle housing mounted on said motor casing in external parallel relation thereto and adjustable circumferentially about said motor casing, a grinding spindle journaled in said grinding spindle housing and adjustable therewith to different operative positions in external radial relation to said motor casing, and a driving connection between said motor and said grinding spindle effective in all adjustments of the latter.

2. A portable grinding tool comprising a motor including a motor casing provided with circumferential guides, a grinding spindle housing slidably mounted upon said guides so as to be adjustable circumferentially of the motor casing, means for clamping said grinding spindle housing in an adjusted position, a grinding spindle journalled in said grinding spindle housing, a driving connection between said motor and said grinding spindle effective in all the positions of the latter, and supporting means connected with said motor casing for supporting the grinding tool independently of the adjustments of the grinding spindle.

3. A portable grinding tool comprising a motor including a motor casing provided with undercut circumferential channels, clamping blocks slidably mounted in said channels, threaded studs fixed upon said clamping blocks and projecting outwardly beyond said channels, apertured lugs through which said studs extend, a grinding spindle housing carried by said lugs and adjustable therewith circumferentially of the motor casing, clamping nuts on said studs for clamping the grinding spindle housing in an adjusted position, a grinding spindle journalled in said grinding spindle housing, a driving connection between said motor and grinding spindle effective in all positions of the latter, and a forked bracket secured to said motor casing and adapted to be secured to the tool post carrier of a lathe for supporting the grinding tool in operative position in said lathe.

4. A portable grinding tool comprising a motor including a motor casing provided with curved guides centered at the axis of rotation of said motor, a grinding spindle housing movably mounted on said guides so as to be adjustable circumferentially about the motor casing, means for clamping said grinding spindle housing in an adjusted position, a grinding spindle journaled in said grinding spindle housing and adjustable therewith to different operative positions in radial relation to said motor casing, a driving connection between said motor and said grinding spindle effective in all positions of the latter, and supporting means connected with said motor casing and constituting a fixed support for supporting the motor in a predetermined operative position independently of the adjustments of the crank spindle.

In testimony whereof I have hereunto set my hand.

ERR S. McGONEGAL.